United States Patent Office 3,019,189
Patented Jan. 30, 1962

3,019,189
MIXED FERRITES BY A COPRECIPITATION PROCESS
Ernst Albers-Schoenberg, Metuchen, N.J., assignor to Steatite Research Corporation, Keasbey, N.J., a corporation of Delaware
No Drawing. Filed Apr. 7, 1958, Ser. No. 726,651
2 Claims. (Cl. 252—62.5)

This invention relates to an improvement in a process for making ferrites by a co-precipitation process.

The idea of co-precipitating metal hydrates and metal oxalates from salt solutions of the constituents of a ferrite body is just about as old as the conception of these materials themselves. Co-precipitation is about as effective a method for intimate mixing as can be imagined, and in the production of these ceramic ferrite bodies, the more intimate a mixture of the raw materials that can be obtained the better will be the final product. Ferrite cores prepared from co-precipitated products are demonstrably superior in quality to cores made from milled oxide constituents.

However, past methods of precipitating metal oxalates from salt solutions leave much to be desired. In all these methods, soluble metal salts are completely dissolved in water and sodium or ammonium oxalate is added to precipitate the desired metal oxalates. However, the salt concentration of the solution builds up rapidly as a consequence of this reaction, and as a result the precipitation reaction is not carried to completion and much material is thereby wasted. Even more important, because the precipitation of all the ingredients of the co-precipitate is not carried to completion, the composition of the co-precipitate is variable. In addition, the precipitate is contaminated with unwanted ions and some of these cannot be removed even by lengthy washing.

It is one object of the present invention to provide a process whereby the desired reaction can proceed to completion and all the desired metal oxalates are precipitated.

It is another object of the present invention to provide a precipitate with an invariant chemical composition.

It is another object of the invention to provide an uncontaminated precipitated product.

It is another object of the invention to make the co-precipitation process applicable to metal compounds not appreciably soluble in water.

It is another object of the invention to reduce the size of equipment needed to carry out the precipitation process.

The present invention is based on the discovery that co-precipitated oxalates of the bivalent metals used in ferrites may be prepared from particle dispersions of the oxides, hydrates, and/or carbonates of the bivalent metals. This is done by the regulated addition of oxalic acid to a slurry of carbonate, hydrate, and/or oxide particles. It might reasonably be expected that the attack of oxalic acid on these particles would produce aggregates of oxalate crystals, and not mixed crystals. It is found, however, that the process produces excellent mixtures of precipitated oxalates. Furthermore, the resultant liquor contains no residual radicals nor dissolved salts—when carbonates are used, the carbon dioxide passes off as a gas, leaving only water, when the oxides or hydrates are used, only water is formed. There is, therefore, no possibility of contamination of the precipitate, nor in actual practice has any been found.

It has been found that precipitation of the bivalent metals as oxalates is practically 100%. Because of this complete precipitation, the composition of the co-precipitate is found not to vary.

Suitable bivalent metal oxides or carbonates that may be employed in the oxalate precipitation process include copper, zinc, nickel, manganese, magnesium, cobalt, ferrous iron, cadmium, calcium, strontium, barium, etc.

After the mixed bivalent metal oxalates have been precipitated, they are mixed with ferric oxide, and the resultant mixture is then fired to make the finished ferrite.

The invention both as to its organization and its method of operation, together with additional objects and advantages thereof, will best be understood from the following description of specific embodiments thereof.

EXAMPLE 1

126 g. of powdered zinc oxide and 282 g. of powdered manganese carbonate are agitated vigorously in 750 ml. of water for about one hour to form a heavy cream-like slurry.

In a separate container 450 g. of oxalic acid $$(COOH)_2 \cdot 2H_2O$$

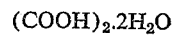

are dissolved in 2 liters of water at about 40° C.

The oxalic acid solution is poured slowly into the slurry. In this process carbon dioxide is driven off and the oxalates start to precipitate. The pH or acidity of the resultant solution is measured continuously or from time to time by indicator paper or a pH meter, for example, and pouring of the oxalic acid solution into the bivalent metal solution can be stopped when the resultant solution is slightly acidic. At this time the precipitation is substantially complete.

The precipitate is allowed to settle, the water is decanted or otherwise removed. The precipitate is washed with fresh water and thereafter separated and dried at about 90° C. When an ignition loss determination is made on the resultant mixture it is found to be very near the theoretical value for the oxalates of the original bivalent metals showing that substantially all of the original metal containing ingredients have been transformed to the oxalate plus 2 molecules of water of crystallization.

Then 225.5 g. of ferric oxide ($Fe_2O_3$) are wet ball milled for 3½ hours with 252.5 g. of the oxalate precipitate and 1150 ml. of water. This mixture is then dried and calcined for two hours at around 1700° F. in air.

To the calcined mixture additional iron oxide is added so that the mixture contains about 4.5% of fresh $Fe_2O_3$ and the product is again wet ball milled with 600 ml. water for 10 hours. The adding of a part of the iron oxide in a separate step is not essential but provides a mixture which may be more easily molded. The mixture resulting from this operation is dried.

To the dried mixture 0.5% of an organic binder (such as methyl cellulose) and about 5% of water are added. Thereafter, the moist powder is molded or pressed and the pressed pieces fired in nitrogen at 2350° F. to 2400° F.

The following table compares the properties of the body made by this example with the properties of a body of the same composition made by the oxide mixing process.

Table

| Properties | Mn-Zn-Ferrite prepared by wet ballmilling | Mn-Zn-ferrite prepared from precipitated bivalent oxides—According to Example 1 |
|---|---|---|
| $\mu_0$, 1 mc | 1,280 | 550 |
| $\mu_0$, 50 kc | 1,300 | 2,800 |
| $Q$, 1 mc | 1.7 | 0.4 |
| $Q$, 50 kc | 80 | 60 |
| $\mu$ max | 5,000 | 6,700 |
| $B_s$ | 4,000 | 4,400 |
| $H_c$ | 0.2 | 0.1 |
| $B_r$ | 1,730 | 1,300 |
| Curie temperature, °C | 150 | 150 |

There are very substantial gains in initial permeability at 50 kc., in maximum permeability and in saturation flux density.

EXAMPLE 2

The process is conducted as in Example 1 except that an equivalent amount of zinc carbonate (194 g.) is substituted for the 126 g. of zinc oxide.

The results obtained are substantially the same.

EXAMPLE 3

The process is conducted as in Example 1 except that 72 g. of zinc oxide and 315 g. of manganese carbonate are employed as the starting materials from which the oxalates are precipitated.

The fired samples show an initial permeability of 1600–1800, a maximum permeability of 5000, a saturation flux density up to 5000 to 5200 and a Curie temperature of 200° C.

EXAMPLE 4

The process is conducted as in Example 3 except that 110.9 g. of zinc carbonate are substituted for the 72 g. of zinc oxide. The results obtained are substantially identical with the results of Example 3.

EXAMPLE 5

13.9 parts of nickel hydrate, $Ni(OH)_2$, 20.5 parts of zinc hydrate, $Zn(OH)_2$, and 2.3 parts of copper hydrate, $Cu(OH)_2$, are agitated with water to form a heavy slurry. The slurry is poured slowly into a boiling solution of oxalic acid containing about 30 parts of acid in 100 parts of water. The oxalates are formed and recovered from this solution, washed and dried. Thereafter, substantially equal mol proportions of the metal oxalates and ferric oxide are ground together in a ball mill and fired at about 2100° F. The resultant product is reground, molded with the aid of a small proportion of water and an organic binder and fired at 2375° F. to density.

This application is a continuation-in-part of U.S. application Serial No. 519,660, now abandoned filed July 1, 1955.

I claim:

1. In a co-precipitation process of preparing mixed ferrites of the formula $(MO,M'O) \cdot Fe_2O_3$, in which MO and M'O together comprise at least two bivalent metal oxides selected from the group consisting of copper, zinc, nickel, manganese, magnesium, cobalt, ferrous iron, cadmium, calcium, strontium and barium oxides, the steps comprising preparing an aqueous slurry of at least two finely divided compounds of at least two different bivalent metals, said compounds of said bivalent metals being selected from the class consisting of oxides, hydrates, and carbonates of said bivalent metal components, thereafter mixing oxalic acid with the slurry whereby metal oxalates of said bivalent metals substantially free of anionic impurities are precipitated, recovering the precipitated bivalent metal oxalates, thereafter mixing said mixed bivalent metal oxalates with ferric oxide to provide the ferric oxide component of the finished ferrite, and firing the resultant mixtures.

2. In a co-precipitation process of preparing mixed bivalent metal oxalates for mixing with ferric oxide and firing to form ferrites of the formula $(MO,M'O) \cdot Fe_2O_3$, in which MO and M'O together comprise at least two bivalent metal oxides selected from the group consisting of copper, zinc, nickel, manganese, magnesium, cobalt, ferrous iron, cadmium, calcium, strontium and barium oxides, the steps comprising preparing an aqueous slurry of at least two finely divided compounds of at least two different ones of said bivalent metals, said compounds of said bivalent metals being selected from the class consisting of oxides, hydrates and carbonates of the metal components, thereafter mixing oxalic acid with the slurry whereby metal oxalates of said bivalent metals substantially free of anionic impurities are precipitated, and recovering the mixed, precipitated bivalent metal oxalates.

References Cited in the file of this patent

UNITED STATES PATENTS

| | | |
|---|---|---|
| 995,041 | Strauss | June 13, 1911 |
| 1,349,947 | DuPont et al. | Aug. 17, 1920 |
| 1,997,193 | Kato et al. | Apr. 9, 1935 |
| 2,459,901 | Stout | Jan. 25, 1949 |

FOREIGN PATENTS

| | | |
|---|---|---|
| 683,722 | Great Britain | Dec. 3, 1952 |
| 739,069 | Great Britain | Oct. 26, 1955 |
| 740,894 | Great Britain | Nov. 23, 1955 |
| 167,792 | Austria | Feb. 26, 1951 |

OTHER REFERENCES

Harvey et al.: RCA Review, September 1950, page 346.